Aug. 7, 1923.

G. H. NASH 1,464,103

SOUND DETECTOR

Filed Feb. 15, 1919

Inventor:
George Howard Nash.
by J. E. Roberts Att'y.

Aug. 7, 1923.

G. H. NASH

SOUND DETECTOR

Filed Feb. 15, 1919

Inventor:
George Howard Nash.
by J.G.Roberts Att'y.

Aug. 7, 1923.

G. H. NASH 1,464,103

SOUND DETECTOR

Filed Feb. 15, 1919

Inventor:
George Howard Nash.
by J. G. Roberts Att'y.

Patented Aug. 7, 1923.

1,464,103

UNITED STATES PATENT OFFICE.

GEORGE HOWARD NASH, OF WEYMOUTH, ENGLAND.

SOUND DETECTOR.

Application filed February 15, 1919. Serial No. 277,338.

(GRANTED UNDER THE PROVISIONS OF THE ACT OF MARCH 3, 1921, 41 STAT. L., 1313.)

*To all whom it may concern:*

Be it known that I, GEORGE HOWARD NASH, a subject of the King of England, residing at 2 Westerhall Road, Weymouth, in the county of Dorset, England, have invented certain new and useful Improvements in Sound Detectors (for which I have filed an application in Great Britain November 2, 1917, application No. 16,021), of which the following is a full, clear, concise, and exact description.

This invention relates to sound detectors and more particularly to sound detectors for detecting the presence and location of sound produced by sources situated under water.

The electrically operated detecting devices at present used by ships in the detection of under water sounds, particularly the sounds emanating from submarines, are of two kinds, viz—

1. Those within or attached to the structural part of the ship.
2. Those suspended over the ship's side.

The former are intended for use when the ship is under way and the latter, by reason of their suspension, can only be operated when the ship is practically at a standstill. In actual practice even the former can only be used when the ship is traveling at extremely low speeds, two or three knots at the most, unless they are used for the detection of a distinct resonant note, such as that given off by a signalling bell. Direction is obtained by placing a device on either side of the ship below the water line, relying on the hull to form a shadow.

Those of the latter type are intended for use when the ship is stationary, as their method of suspension precludes their being used when the ship is in motion. Of this latter type, there are two distinct kinds, one that fails to respond when its edge is pointing towards the source of sound and another in which response on one side differs in quality or degree from that on the other side.

The two general types of detecting devices mentioned are therefore objectionable in that they cannot be used when the carrier ship is moving at speed. Furthermore with the first type the determining of direction of location of sound from ship is a slow tedious process as it requires that the course of the ship be continually altered, and owing to the noise produced by the flow of water past their diaphragms, or the vibrations set up by waves striking against the hull of the ship or from vibrations produced by mechanical means within the ship, such devices fail to accomplish the purpose for which they are designed, as for the detection of complex sounds comparative quiet is essential. The second type suffer similarly, as well as from vibrations due to the waves hitting their suspension members and also in hitting the sides of the ship, these latter causing the ship's skin to reflect them back across the small intervening water space into the detecting device.

Of the two kinds of detectors above mentioned as usually used suspended over the sides of the ship there is the particular advantage that, if two such devices are used, one of each kind in combination, one may be used to find a line or bi-direction with the carrier ship in the centre of that line and the second one may be used to divide that line and to find from which true direction the source of sound or vibration is received.

From the above it will be realized that if by any means it were possible to move the two detecting devices or transmitters which are hung over the side through the water so that no noise should be created from such movement and also at such a depth beneath the surface that the noise from waves breaking against each other should reach them so faintly as to be scarcely audible and also at such a distance from the ship that the water dashing against the ship shall likewise be scarcely heard, and the detecting device or devices be so arranged that one may be brought into position with its edge towards the ship, then the sounds from enemy craft or other vessels can be plainly heard in such detecting device or transmitter or a plurality thereof while at the same time the propeller sounds from the carrier ship would be inaudible providing that the source of sound does not correspond with the longitudinal axis of the carrier-ship. Also, if by a remote electrical device it became possible to turn these detectors about their own axis, then all the advantages of obtaining the direction of sound which are now obtained by means of detectors suspended over the ship's side when not in motion, could then be obtained whilst the ship is under way and even in a heavy sea. Hereinafter the carrier-ship will be designated as the "parent-ship" to differentiate such from the carrier containing the detecting instruments.

The object of this invention, therefore, is the provision of means for listening on and fully controlling the movements of a hydrophone directional detecting device or devices in such a manner as to enable an operator using such device or devices to find the exact position of a sound-source produced under water at a distance whilst the parent-ship carrying the operator or user is travelling at speed in any weather.

In carrying out this invention, the following objects have been attained:—

(*a*) A provision of a carrier for carrying a detecting device or devices through the water at speed in such a way so as not to cause any noise due to motion, and which is so constructed that sound vibrations from a distance pass through its walls and affect the detecting device or devices within its interior exactly as though no such carrier enclosed the said detecting device or devices.

The term transparent walls as used in this specification is meant to indicate walls which act in the above manner.

(*b*) The provision of a means for towing such carrier from a parent-ship in such a way as to prohibit noise from or generated by the parent-ship from reaching the carrier along the path of the towing medium.

(*c*) The provision of a detecting device or devices associated with a system of remote electrical control whereby the operator in the parent ship may listen on and control at will the movements of the detecting devices within the carrier such movements being contributory to the obtaining of direction.

(*d*) The provision of electrical and mechanical elaborations based on known art which considerably aid the rapidity and accuracy with which the device may be used.

Hereinafter, the term "detecting device" will be omitted and in its place the term "transmitter" will be substituted. It is to be noted that the term "transmitter" describes that part of the hydrophone gear which is immersed in the sea in order to be affected and to transmit the sound vibrations received through the sea from a remote source of sound.

A feature of this invention consists in providing a sound sensitive detector in an outer stream-line casing or container having sound transparent walls the intervening spaces between the detector walls being filled with a liquid.

In the method of defining the actual distance of the sound-source from the parent-ship reference is hereinafter made to the British Patent No. 13,973 of 1915.

The accompanying drawings illustrate one method of arranging the invention, wherein:—

The following is a description of one way of adapting the invention for the purpose of useful application.

The carrier may be comprised mainly of metal and approximately fifteen feet in length. The diameter may be of such a proportion as shown in the drawings.

In the paragraph (*a*) of the statement of invention the feature may be constructed as follows:—

Figure 2:
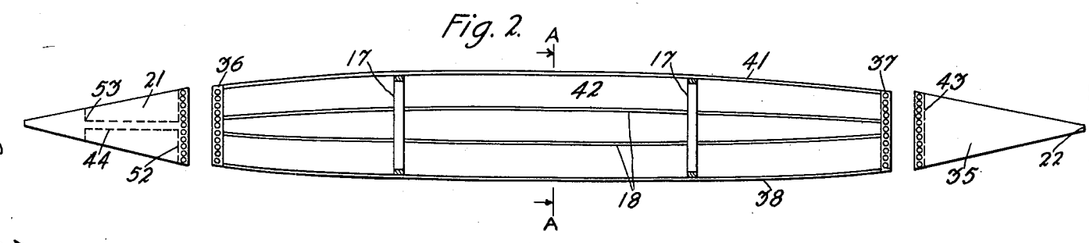
Fig. 2, is a view of the carrier shown in Fig. 1, the end portions being separated from the body portion to more clearly show the construction.

Two circular iron bands are provided as at (37) and (36) Fig. 2, and attached to these, and at equal spacings about their periphery, are placed twelve wooden stringers (41), (18), and (38), Fig. 2. The spaces between these stringers are covered by panels of thin sheets of nickel silver which are bedded on the stringers by thin strips of rubber to act as cushions and which are attached to the stringers by a large number of small screws around the edge of each panel. To maintain the rigidity of the structure circular rings as at (17) are provided.

Hermetically sealed conical air chambers are formed as at (35) and (21) such sealing being obtained by suitable plates (43), (22), (52), and (53); that shown at (21) has a circular tube (44) forming a way right through the chamber (21) that shown at (35) has four vanes (51) at right angles to each other with their major axis corresponding to the longitudinal axis, of the chamber. The assembly of the two chambers (35) and (21) with the body (42) by screws thus forming the carrier. The air chambers (35) and (21), are made of suitable material such as thin sheet steel, in order to maintain their shape against water pressure when immersed at considerable depths.

Figure 1:
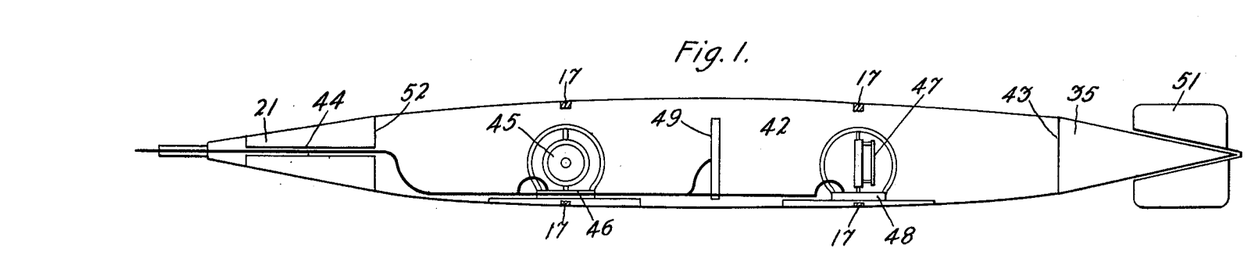
Fig. 1, is a sectional elevation of the carrier showing the position of the transmitters and depth gauge.
Figure 3:
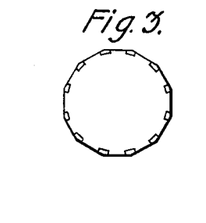
Fig. 3, is a sectional view on the line A—A of Fig. 2.

The assembly of the transmitters (45) and (47) with their motors (46) and (48) and of the depth gauge (49) all to be described hereafter are shown in the sectional elevation at Fig. 1. The Fig. 3 more particularly shows a cross section of the carrier about the line A—A, Fig. 2, in which ribs (41), (18) and (38) are displayed. For the sake of clearance, the fins (51) are omitted from Fig. 2.

In the nose of the chamber (21) forming the nose of the carrier and immediately in front of tube (44) Fig. 2, is placed a special towing arrangement as follows:—

Figures 4, 5, 6:
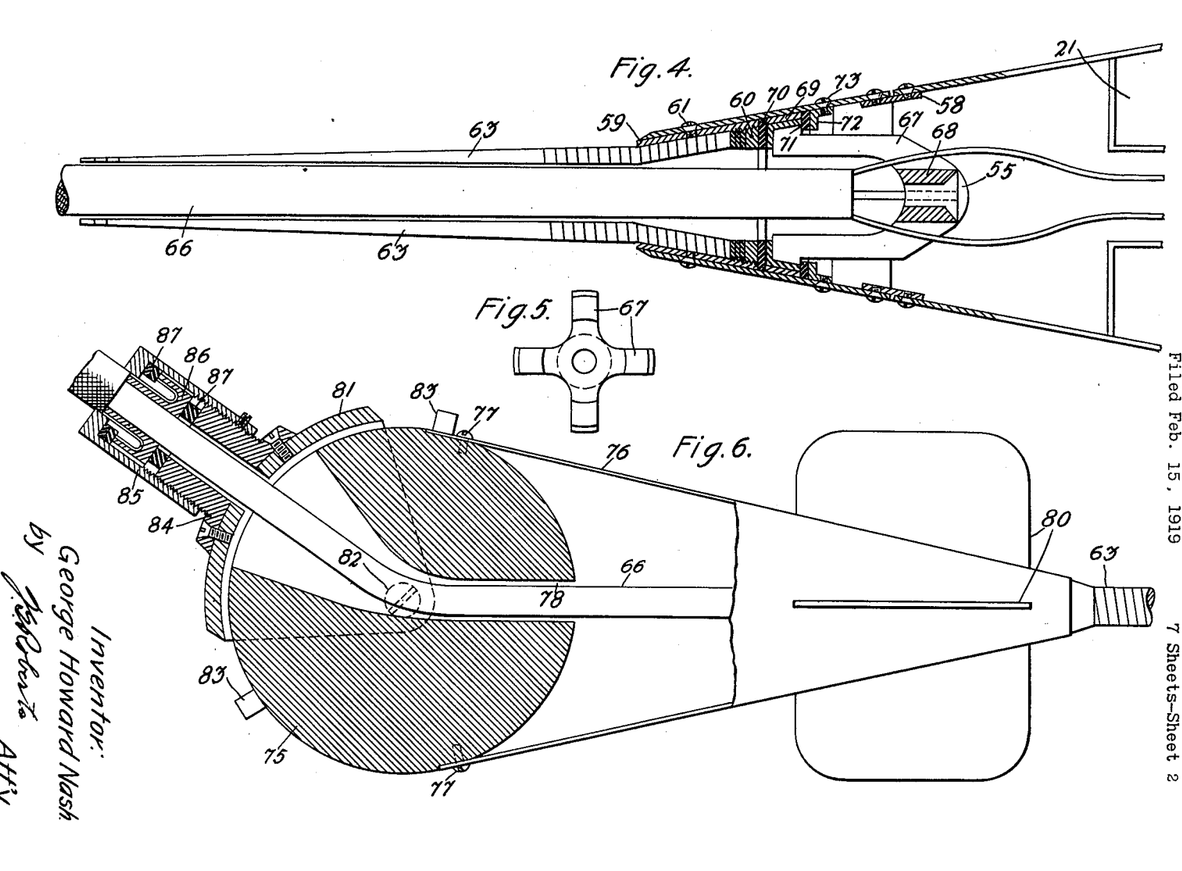
Fig. 4, is a sectional view of the towing end of the carrier illustrated in Figs. 1 and 2.
Fig. 5, represents the relative section and spacing of the four feet of the spider.
Fig. 6, is a view, partly in section, of the towing weight showing one method of mounting the towing and power cable.

The extreme nose of the air chamber (21) is made removable by jointing plates (58) Fig. 4. In the smaller end of this removable portion is placed a circular thimble (59) secured in position by screws (61) in which is secured a spiral protector (63) by means of nut (60). The spiral protector (63) is formed by spiralling three sixteenths of an inch square spring steel to the shape shown in the Fig. 4, the taper towards the left hand end being obtained by subsequent grinding of the spiral. The nut (60) forms a seat for rubber cushions (70), butting against this cushion is a circular shaped washer (69) which is again held in position by rubber cushion (71), circular washer (72) and screws (73). The object of the circular washer (69) is to hold the four feet of the spider (67) which feet and legs comprise four rectangular pieces of steel which meet together and form an arch at (68). Relative section and spacing of the said four feet of the spider are shown in Fig. 5. It will be understood that by the above constructed spider (67), whilst being securely gripped in the nose of the air chamber (16) is not mechanically connected with it in order that vibrations reaching spider (67) can only pass to the walls of the air chamber (16) by traversing the said rubber cushions.

Referring to paragraph (b) of the statement of invention, the carrier is towed behind a towing weight (Fig. 6) which travels in the sea approximately fifty feet ahead of the carrier. The towing weight is in turn towed from the parent-ship and is of such weight as when combined with carrier length of cable between the parent-ship and the towing weight, determines at what depth the carrier proper shall run beneath the surface.

The towing weight comprises a circular iron ball weighing approximately one hundred pounds fitted with a stream-line sheet metal wall (76) which likewise has four fins (80), welded at right angles to the wall (76). In the tail of this stream-line body is fitted an identical assembly of spiral protector and spider as shown in Fig. 4, (59), (61), (63), (60), (70), (69), (71), (72), (73), (67) and (68).

It is, however, not necessary to have the end of the stream-line chamber detachable as is the case at the nose of the chamber at (58) Fig. 4, because access may be had to the internal fittings by the removal of the stream-line body from the iron ball by screws (77).

A circular hole is cast in the weight at (78) which after reaching the centre of the ball makes a turn of approximately forty degrees towards the top of the ball. The hole gradually changes from being circular to a rectangular formation maintaining its breadth but increasing its depth.

The brass segment shown in section (81) is made to hinge about screw (82), the said segment being given sufficient play between stops (83) in order to permit the cable (66) to follow the changing angle between the said segment and the length of the weight. Fitted on top of the segment is a brass nipple (84), with brass cap (85) which houses metal cup 86 and is protected by rubber cushions (87). The towing weight thus formed is approximately thirty inches long and of proportion as shown in Fig. 6.

The cable which tows this weight is reeled on the parent-ship on a winch of common construction which is fitted with twenty electrical contacts so arranged that when desired the twenty conductors in the cable can be electrically connected through the winch to the in-board controlling apparatus.

A portion of the cable has the braiding armouring and jute covering removed thus exposing the smooth cab-tire cable. Its length is threaded through the cap (85), the cup (86) washers (87), the nipple (84) the sector (81), the iron ball (75), the stream-line body (76), the spiral protector (63) the entire length being drawn through these said parts until it is prevented by the increased diameter owing to the presence of the armouring.

The armouring wires are then bent into the form of hooks and sealed in the cup (86), by white metal. The cup is then secured in position by the assembly of caps (85) to nipple (84) thereby attaching the towing weight to the steel armouring of the cable. The stream-line body (76) being detached from ball (75) access is gained to the cable (66) immediately behind the iron ball. At this point, for a distance of nine inches the outside cab-tire covering of the cable (66) is removed thus freeing the twenty internal conductors and exposing the internal towing strand. This strand is cut at this point, the part going towards the parent-ship being left spare, the part going towards the spiral protector is fitted with a nipple (55) which is locked in a hole in the crown of the spider (68) in the tail of the towing weight. It will now be understood that the towing weight is towed from the parent-ship by the external steel armouring of the cable, whereas the cable leaving the tail of the pilot weight is anchored to it by the internal steel rope, the conductors passing freely through the towing weight without any mechanical strain whatever thereon.

The tail end of the cable projecting out of the tail of the weight is now assembled into the fish or carrier by having the cab-tire removed for a length of six feet. The internal wire rope is assembled to nipple (55) and is anchored in spider (68) in the nose of the chamber (21). The twenty conductors being equally divided between the four arms of the spider pass freely by and beyond it and through the tube (44) in the front air chamber (21) and so on into the interior of the carrier.

Figure 7:
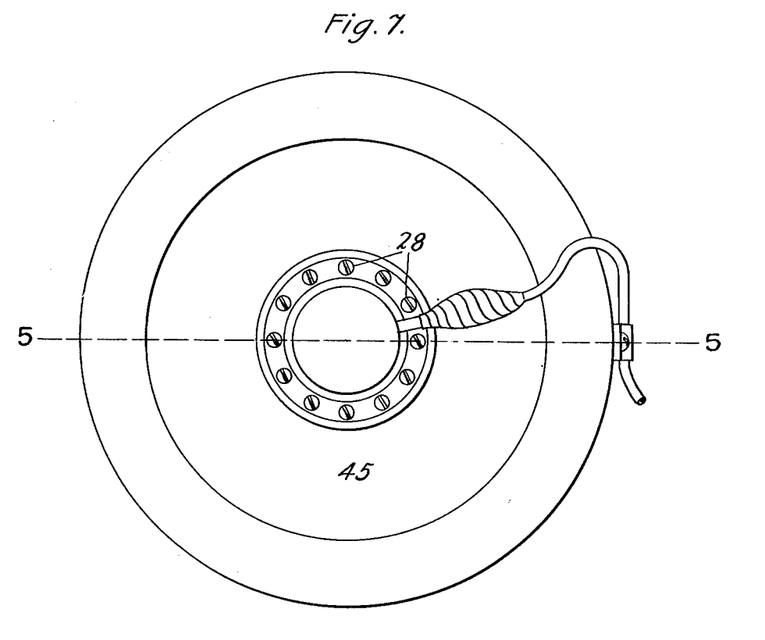
Fig. 7, is a front elevation of the line transmitter.
Figure 8:
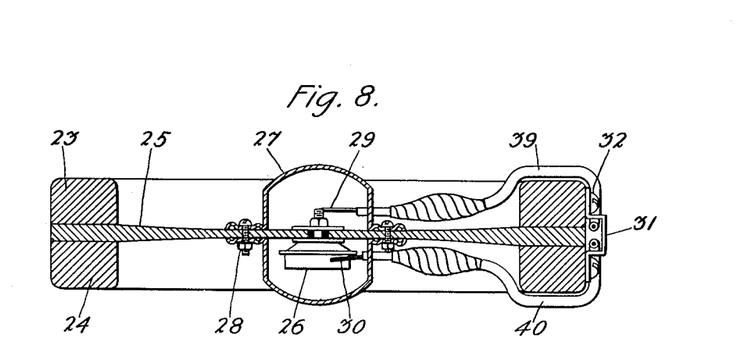
Fig. 8 is a sectional view of the line transmitter on the line 5—5, of Fig. 7.

With reference to paragraph (c) of the statement of invention, the hydrophone shown at (45) (Fig. 1) is more particularly shown at Figs. 7 and 8. It consists of a circular metal plate or diaphragm (25) around the rim of which is placed circular rings (23 and 24), these rings being tightly attached to metal plate (25). In the centre of the said plate is attached a microphone button of a well known type (26), and as the whole metal plate (25) is immersed in water, it is essential to keep water from the button (26) which is accomplished by covering the button with metal cups (27) which may be attached to the plate (25) by twelve bolts (28). The insulated conducting leads (39) and (40) are brought through and sealed in metal tubes in a known manner and then the electrical conductors proper are connected to the button at (29) and (30). The insulated conductors are clamped to the outside rim of the device by clamp (31). This device when suspended in the water forms what is known as a line or bi-directional hydrophone transmitter.

Figure 9:
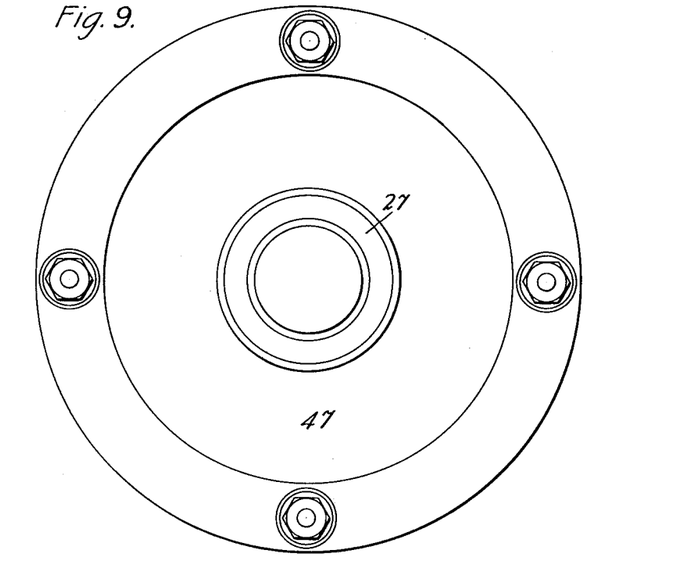
Fig. 9, is a front elevation of the half-line transmitter.
Figure 10:
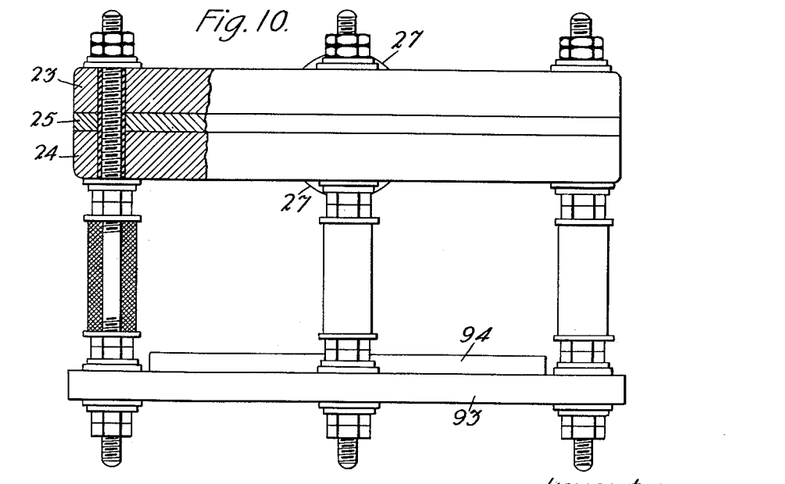
Fig. 10, is an end view of the half-line transmitter in section.
Figure 11:
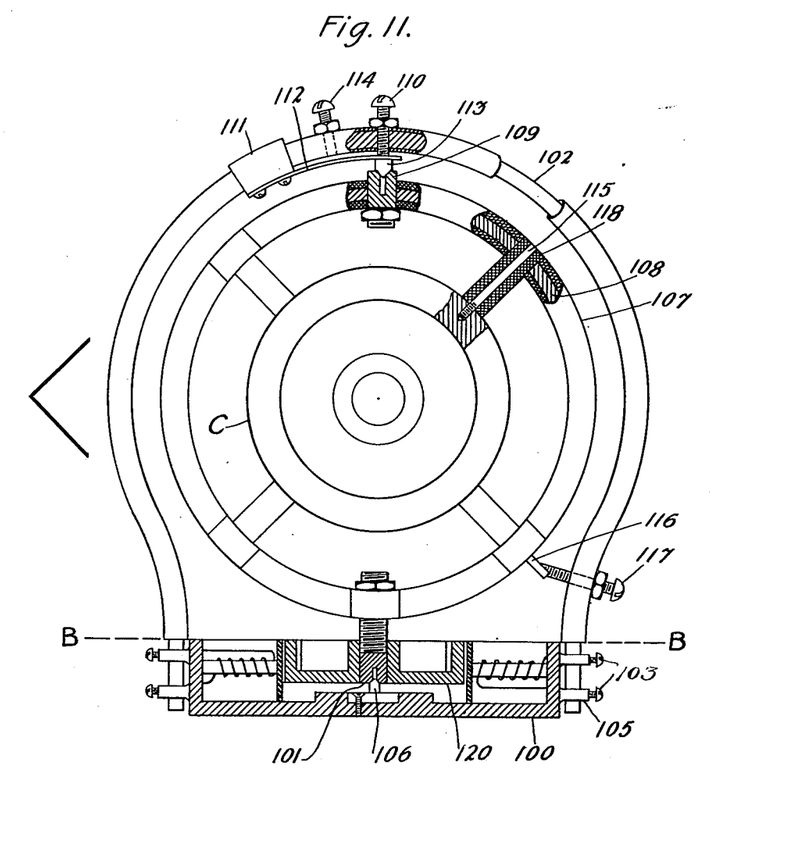
Fig. 11, is a sectional elevation of one of the driving motors for the transmitters, with a transmitter in position thereon.
Figure 12:
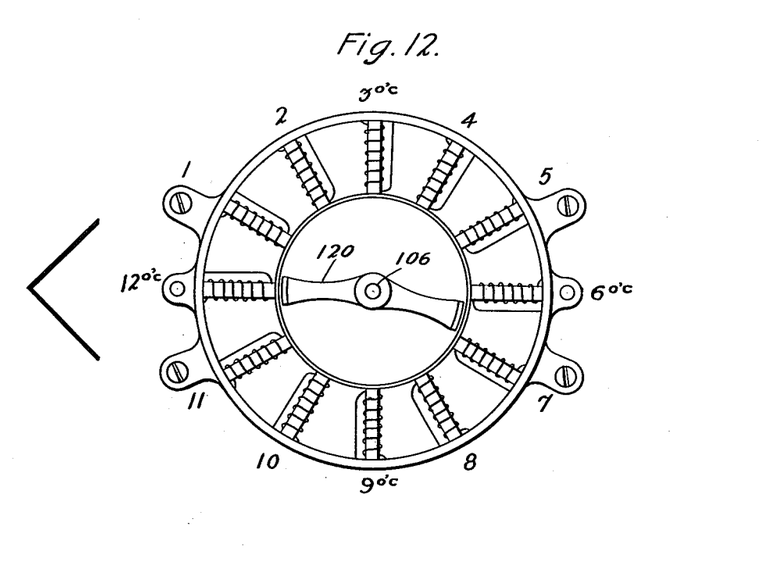
Fig. 12, is a plan view of the motor mechanism taken on the line B—B of Fig. 11.
Figure 13:
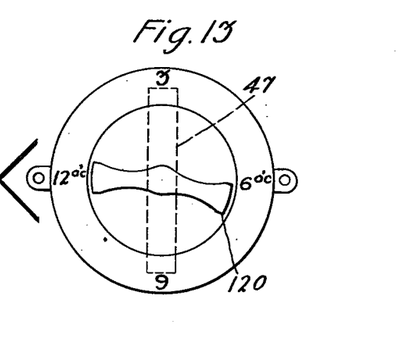
Fig. 13, is a diagrammatic view showing the relation of the half-line hydrophone to the armature of its motor.

The detector shown at (47) Fig. 1, is more particularly shown at Figs. 9 and 10. The parts (23), (24), (25) and (27) and the method of assembling the button and the clamping of the leads and the like are identical in this instrument as in the former one shown at Figs. 7 and 8. In addition, however, four holes are made through the rim and four rubber insulated bolts are secured in them having on their outer end a circular flat plate shown at (93) of which the raised portion (94), the arrangement of which is not claimed herein, may be constructed in any suitable manner to render the diaphragm (25) facing the plate (93) in-operative to sound detection in the area of the said plate (93). This device when assembled in the water forms what is known as a uni-directional or half-line hydrophone transmitter.

The depth gauge (49) Fig. 1 may be of any known construction, its object simply being to record by water pressure the depth at which the gauge and consequently the carrier is under the water.

An electrical circuit containing a battery and a current measuring instrument is connected by two wires with the gauge 49 in the carrier and is calibrated to read in immersed feet.

The mountings of the hydrophones (45) and (47) are both formed in an identical manner and are attached to motors of similar design, but the transmitter (47) is assembled to its motor ninety degrees out from that of (45). They are more clearly shown in the drawings at Figs. 11 to 14.

The transmitter, Fig. 7, is assembled in the brass ring (107) by four equally spaced metal rods (115). At the top of the brass ring is a vertical cone bearing (109) which pivots on pivot (113). At the bottom is a similar but longer bearing (101) working on pivot (106). Attached to the outside of this bearing is the two-pole armature (120) Fig. 12.

In the transmitter (45) a diaphragm, 25 also hereinbefore referred to as a metal plate is shown in elevation in Fig. 7.

The outer periphery of this diaphragm is of a greater thickness than at the centre. The diaphragm may, therefore, be regarded as comprising a series of rings of increasing diameter and thickness from the centre to the outer periphery. Each ring may be considered as possessing a natural frequency of its own, and varying in frequency from the ring on either side.

The motor provided consists of an iron casting forming a base and outside wall (100) within which are spaced radially twelve magnet coils, the inside ends or pole faces pass through the inner wall of the cup (100) which are of a non-magnetic metal. The recess formed between the two walls of the base and in which are placed the twelve coils, is then completely filled with some waterproof electrical insulating compound. The conductors supplying current to the twelve coils are brought out at the top of the compound in any convenient manner. Attached to the outer casting by means of lugs (105) and screws (103), is a metal hoop (102) to the top portion of which is attached metal block (111) carrying spring (112) at the extreme end of which is attached pivot (113).

Figure 14:
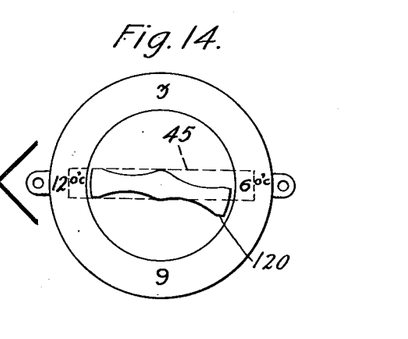
Fig. 14, is a diagrammatic view showing the relation of the line hydrophone to the armature of its motor.

By means of screw and lock-nut (114), the pressure on the pivot may be adjusted, screw and lock-nut (110) serving to prevent the vertical lift of the pivot after such adjustment. An extension of one metal rod at (116) serves to act, together with metal screw (117), as a stop device preventing the transmitter, Fig. 7, together with its ring mounting (107) from turning more than one complete circle. It is pointed out that all metal surfaces apart from the transmitter, are wherever possible covered with rubber or other vibration damping material, such as at (118) and (108). The transmitter, Fig. 7, is assembled to the armature as shown at Fig. 14, the transmitter (Fig. 10) is assembled to the armature as at Fig. 13. The transmitter Fig. 7 when mounted on a motor, is shown at (45) and (46) Fig. 1. The transmitter Fig. 10 when mounted on a motor is shown at (47) and (48) Fig. 1. The motor bases are secured to the bottom of the carrier in any convenient manner preferably by screws through lugs on the outside of the base of the motor into the wood stringers. The size and proportion of this motor may be obtained from Figs. 11 and 12 which are to the same scale as the transmitter, C, Fig. 11 and which is five and a half inches in diameter. The depth gauge (if included in the equipment) is mounted as at (49) Fig. 1. The apparatus (45) (47) and (49), Fig. 1, are all on the centre-line of the carrier.

It is an essential feature of the invention that water shall make contact with the instruments (45), (47) and (49), thereby making physical contact between the diaphragms of such instruments and the actual walls of the carrier. This may be added before, or the device may be designed so that it is filled with water after immersion.

It is also found that if the device (or devices) is carefully balanced when in water so that it floats on an even keel with a very small amount of buoyancy that the travelling through the water is improved thereby. The careful balancing thus desired may be obtained by adding weights to the interior of the carrier.

The twenty conductors which pass along tube (44) into the interior of the parent-ship are disposed as follows:—

One each is connected to the twelve coils of the motor, one is connected to the common of the twelve coils, two are connected to the microphone button of transmitter (45) Fig. 1 two are connected to the transmitter (47), and two are connected to the depth gauge (49), and one is spare. Those which feed immovable apparatus are cleated to the side of the carrier in any convenient manner. Those which feed the rotatable transmitters are formed into an helical spiral in order to facilitate such movement.

Within the parent-ship, the two wires from transmitter (45) and the two from transmitter (47) are taken through a two-way change-over key and connected up to an induction coil and transmitter batteries in a manner well-known in telephony.

The listening telephone receivers are connected by standard telephone keys in turn to the following circuits as found necessary:—

(e) To a telephone circuit connected with the navigating bridge.

(f) To the secondary of the hydrophone induction coil.

(g) To the secondary of the hydrophone induction coil in conjunction with an adjustable shunt resistance across the receiver.

(h) To the secondary of the hydrophone induction coil in conjunction with a receiver short circuiting key on the handle of the control switch of the motors within the carrier.

The paragraphs (e), (f), (g) and (h) of the above may be taken as referring to paragraph (d), of the statement of invention.

The first object is to eliminate the necessity of the operator having to remove his receivers in the midst of hydrophoning in order to communicate his detecting results to the officers on the navigating bridge. The speech telephone transmitter for this purpose is mounted in a convenient position on the face of the apparatus.

The second object (f) is for the ordinary use of the hydrophone apparatus.

The third object (g) is for the use of the hydrophone apparatus for obtaining the distance at which the sound to be detected is away from the carrier and is obtained as follows:—

According to the British Patent No. 13,973 of 1915, of a land mining detector, an arrangement is described of means for determining the distance between a source of sound produced in the earth and a microphonic detector on or in the earth by the shunting of the listening receiver and the expressing of such shunt values in terms of distance.

A similar method to that referred to above is used herein but owing to the hydrophone device or devices only having to act in sea water, the operation is rendered easier than is the case of that disclosed in the British patent above referred to, because in land operations varying densities of soil have to be negotiated.

The fourth object (h) is to considerably facilitate the "halving of the line" which action is necessary in the operation of locating and which will be referred to in detail hereinafter.

In the adaptation of the invention in the manner now being described, it is necessary for the correct detection of the distant sound source for the two motors in the carrier to be in synchronism. It is the practice amongst individuals using this gear to make use of the fact that there are twelve live studs on the switch and that there are similarly twelve coils in each of the motors in order to use a clock-like notation when describing such gear. The clock notation is used by calling the coil 6 o/c which controls the armature when the latter is in position against the stop (116) and (117) Fig. 11. As the stop is always placed nearest to the rear of the carrier, then the coil which causes the armature to take up the diametrically opposite that is the position which is towards the nose of the carrier is 12 o/c. The direction of movement or voyage both for the carrier and for the parent-ship is indicated on the drawings by the sign "<".

Similarly in the parent-ship the gear is so set up that the stud on the control switch which corresponds to any particular coil bears the same relation to the parent-ship as does the motor coil to the carrier so that the 12 o/c stud is nearest to the nose of the ship and the 6 o/c stud is nearest to the rear of the ship.

Figure 15:
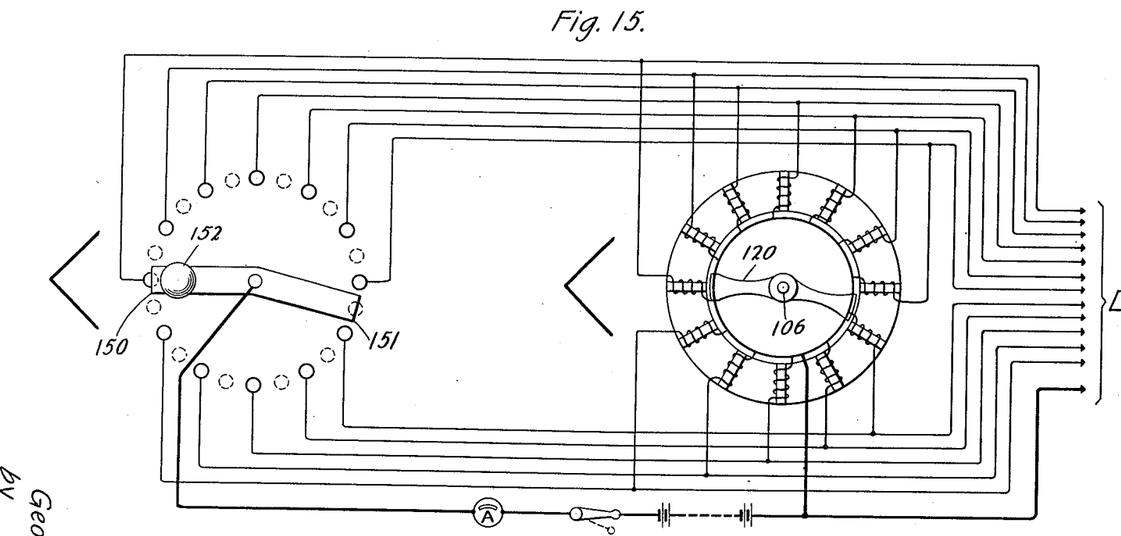
Fig. 15, is a simplified circuit arrangement of the control switch which moves the motors in synchronism step-by-step.

A stop is provided on the switch-arm (150) Fig. 15 which hits a projection placed immediately over the 6 o/c stud so that the switch arm, the twelve studs, and the stop, bear and have exactly the same functions as the armature, the twelve coils and the stop in the motor or motors. The operation of bringing the motors in synchronism therefore, is as follows:—

Consider that the switch handle (152) Fig. 15 is in any position, say 3 o/c, the brush arms (150) and (151), of the switch will occupy the positions of 3 and 9.30. If now the battery switch is closed and the handle is revolved from 3 to 6 o/c and then is revolved backwards, through 12 o/c to 6 o/c, it will be observed that no matter what positions the armatures (120) are of either motor, they will at some time or other during this operation be brought in step with the switch-arms and will from that moment follow the switch-arms and handle.

The actual manner in which the electrical circuits are established to make the armatures follow the arms of the control switch in either direction will be clear from the following description:—

A switch is manufactured in any well known manner so that twelve contact studs are arranged about a circle and two arms of the switch are arranged to contact with such studs but are displaced one to the other so that when one arm is making on 12 o/c, the other is midway but not bridging between 6 and 7 o/c.

In each case, the switch is assembled in the parent-ship, and the motor is assembled in the carrier so that the 12 o/c position is that which causes the switch-handle (152) to be pointing towards the nose of the ship. The twelve studs are connected to the twelve coils of the motor, and the centre point of the brush arm is connected through an ammeter, and twenty-four volt battery to the common return.

In the position shown in Fig. 15, when the battery switch is closed, the 12 o/c coil is excited. As the switch-handle (152) is revolved in a clock-wise direction, brush arm (151) will contact with stud 7 o/c before the brush-arm (150) leaves stud 12 o/c and the current will divide between the 12 o/c and 7 o/c studs causing the armature of the motor to divide the flux of the 12 o/c and 7 o/c coils in a similar manner thus giving to the armature and therefore to the transmitter attached to it a movement equal to one forty-eighth of a complete circle.

As the switch-arm (152) is further revolved in a clock-wise direction, the brush-arm (150) will leave the stud 12 o/c entirely, and the brush-arm (151) will remain in contact with stud seven thereby causing the flux in coil twelve to die away permitting the flux in coil seven to fully attract the armature thus imparting a further one forty-eighth movement to the device.

The second motor shown in the carrier Fig. 1, is connected in parallel with the first and acts in a precisely similar manner. The conductors terminating at D, Fig. 15, lead to the other motor or motors referred to herein.

The gear in use is so assembled that the handle of the switch actually gives the direction of the submarine as from the carrier, and if the sound-source is not very close, say one thousand yards or more away, for all practical purposes the switch handle (152) when the operator is detecting and locating the position of the submarine, will be found to physically point at the sound-source or submarine, therefore, it is imperative that the navigating officers of the parent-ship should know exactly in what position the handle of the switch is pointing at the moment the observations are finished. In order that this may be accomplished one or more indicators controlled by motors of exactly similar design to those used in the carrier are connected to the control switch in such a manner that they are electrically in parallel with the motors in the carrier. These indicator-motors may have attached to them an indicating device (160) Fig. 16, such as a movable arrow pointer, said indicating device may be placed in essential positions on the parent-ship such as the navigating bridge, the gun platform, and the like. Such indicating device by being arranged in parallel with the motors in the carrier will consequently always indicate the exact position to which the switch-handle has been moved, and will also point to the sound-source whenever such source has been detected.

Figure 16:
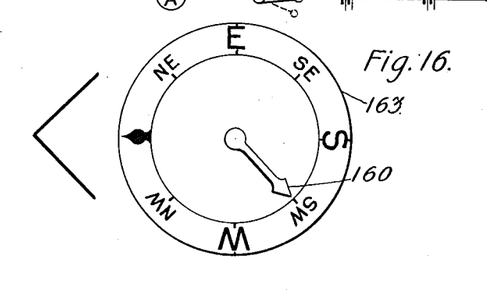
Fig. 16, is a view of the indicating dial which bears the points of the standard marine compass, and is secured to one of the armatures of a synchronous step-by-step motor.

The construction of the motor driving the indicator or indicators may be exactly similar if conveniently smaller than those in the carrier but the armature is made to revolve the pointer 160 only. Placed around the said pointer, but in no way connected with it, is a ring (163). This ring forms part of the outer casing enclosing the indicator-motor but may be revolved about such outer casing by hand. The outer ring (163) may be marked with the points of the standard compass and adjusted by the navigator to indicate the same navigating course as that on which the parent-ship is travelling.

In Fig. 16 the parent-ship is assumed to be travelling due north, if, therefore, the operator in the cabinet determines that the position of the submarine is on the port quarter and by the use of the apparatus causes his switch-handle to physically point towards the submarine, the indicator pointer (160) Fig. 16 will also physically point to the submarine and will indicate that the submarine is southwest of the parent-ship.

Not only does the foregoing indicating device give the advantage of direct compass bearings as set forth, but also serves to make a correction in case the parent-ship changes her course whilst the operator is making a bearing.

In using the apparatus hereinbefore described, the carrier has its main body (42) Fig. 1, filled with sea water and is then lowered into the sea, the towing weight Fig. 6 is then also lowered into the sea to a depth which varies with the state of the weather and the depth of the ocean and the speed of the parent-ship conditions permitting, approximately one hundred and fifty feet of cable is lowered between the weight and the said ship.

Owing to the angle of tow taken up by the cable due to water resistance, the towing weight runs between twenty-five and sixty feet below the surface according to the speed of the towing or parent-ship. The carrier follows fifty feet behind at similar depths.

The operator on taking his position at the control switch-board closes the main battery circuit and rotates the switch-handle through a complete circle. This causes both the transmitters in the carrier and the indicators, at the various strategical points of the parent-ship, all to become in step with each other and with the handle of his control-switch.

By means of a telephone key provided, he now connects his listening telephone receiver to the transmitter (45) Fig. 1. This instrument has the property of hearing any sound in the vicinity provided such sound is not immediately opposite one or other of its two edges.

If the engines of the parent-ship are making so much noise as to confuse listening they are stopped for a few seconds, the detected sound now being heard, the switch-handle is turned causing the transmitter (45) to likewise turn until the sound is not heard. In this position, transmitter (45) is actually edge-on to the source of sound and the switch-handle is therefore either pointing direct at the source of sound or one hundred and eighty degrees away from it.

By means of a telephone key provided, the operator now transfers his listening apparatus onto transmitter (47), when owing to this transmitting instrument being displaced about ninety degrees about its axis from that of transmitter (45), it is in such a position that one of its two faces is towards the advancing sound-wave.

The operator consequently listens to the latter sound-wave and notes its value, when by means of the switch-handle he reverses the transmitter by turning his switch-handle through one hundred and eighty degrees thereby exposing the other face of the transmitter to the advancing sound-wave. If the sound is now louder than previously, then his switch-handle is actually pointing at the source of sound whereas if it is weaker than before his switch-handle is then pointing one hundred and eighty degrees away from the source of sound in which case he will restore the switch-handle to its former position thus causing it to point at the source of sound.

In practical working, it is found that at times difficulty is experienced in determining on which of the two faces of transmitter (47) the sound-source is, which difficulty arises out of the lack of knowledge in the art as to how to make one face of transmitter (47) considerably louder than the other. A key is therefore provided which enables the operator to short circuit his listening telephone receiver during such time as he exposes first one and then the other face of transmitter (47) to the sound wave. By thus providing him with two distinct listening periods with a perfect silence in between these said two periods his mind is easily able to determine on which of the two faces of transmitter (47) the response is the louder. After the operator has decided on which half of the line the sound-source actually is, the switch-handle is left in the position pointing to the sound-source and by reason of a further telephone key provided, an adjustable shunt is brought to bear across his listening receivers. This shunt having previously been calibrated in terms of distance as previously set forth herein, he is now able by shunting his receiver to approximate the distance at which the sound-source is from the carrier.

The short-circuiting key above referred to may also be brought into use to silence his listening receiver whilst either of the instruments (45) and (47) are being turned should the noise of such turning, owing to mechanical imperfection, be such as to detract his attention.

Having determined the direction and distance away of the sound-source the operator, by means of a further telephone key, electrically transfers his listening receivers to a local telephone circuit communicating with the bridge over which he informs the navigating officer the distance away of the sound-source, the direction of such sound-source being already communicated to the officer by means of the visual indicators provided. The complete series of detecting and localizing operations above described occupy approximately thirty seconds during which time any loss of way which may occur on the parent-ship is negligible.

It is desired that it should be understood that the use of the invention is not limited to the manner of assemblage shown in the drawings, neither to the adaptation described herein.

What is claimed is:

1. Apparatus for detecting under-water vibrations comprising a completely submersible container adapted to be towed through the water, a body of liquid within said container in contact with the walls of said container, such walls being transparent to sound vibrations existing in the water in which said container is submersed, a cable for towing the carrier through the water, and means entirely embedded in sound damping or vibration insulating material enclosed in or attached to the nose of said carrier for securing the cable to the carrier.

2. Apparatus for detecting under-water vibrations comprising a completely submersible container, a body of liquid within said container in contact with the walls thereof, a plurality of detecting devices included within said container, and means for rotating said detecting devices within the liquid.

3. Apparatus for detecting under-water vibrations comprising a completely submersible container, a body of liquid within said container in contact with the walls thereof, and a plurality of detecting devices included within said container, said detecting devices being rotatable about their respective axes, one device serving to indicate a sharp bi-direction and the other to obtain a uni-direction from the previous bi-direction.

4. Apparatus for detecting under-water vibrations comprising a completely submersible container, a body of liquid within said container in contact with the walls thereof, a plurality of detecting devices included within said container, and sound damping means for covering all non-vibrating parts of the detecting devices and all sound receiving and reflecting surfaces associated with the means for suspending or rotating the detecting devices.

5. Apparatus for detecting under-water vibrations comprising a completely submersible container, a body of liquid within said container in contact with the walls thereof, a cable for towing the container from a parent-ship, and a weight intermediate the cable and container, said cable passing through the weight in such a manner that the angle formed by the cable between the weight and the parent-ship and the horizontal path along which the weight is traveling may be changed by the changing speed of the parent-ship without any mechanical strain being exerted on the electrical conductors in the cable through such changing angle.

6. Apparatus for detecting under-water vibrations comprising a completely submersible container, a body of liquid within said container in contact with the walls thereof, a cable for towing the container from a parent-ship, and a spherical towing weight intermediate the cable and container through which said cable passes, said weight having a segment of a sphere hinged about the axis of the sphere from which segment the tow of said sphere takes place.

In witness whereof, I hereunto subscribe my name this 13th day of November A. D., 1918.

GEORGE HOWARD NASH.